E. A. LOCKE & W. B. MASON.
Locks for Express Bags, &c.
No. 5,734. Reissued Jan. 20, 1874.
Fig. B
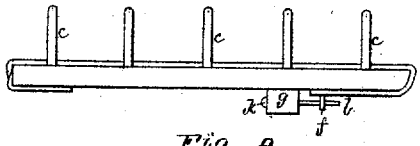
Fig. A.
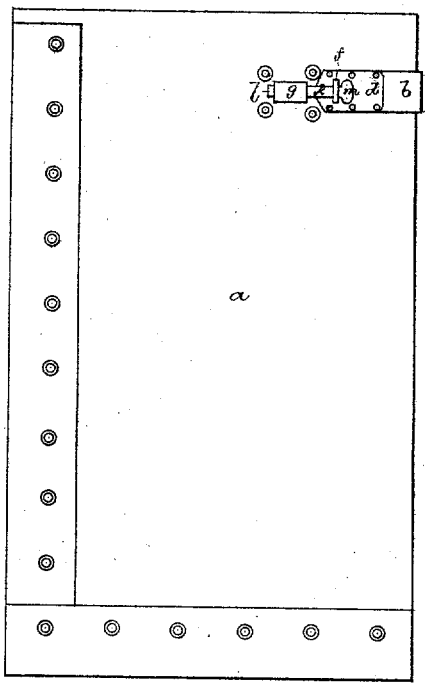
Fig. C.
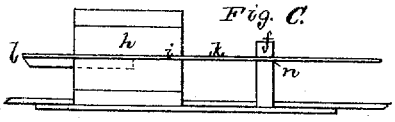
Fig. I.
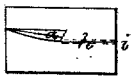
Fig. D.
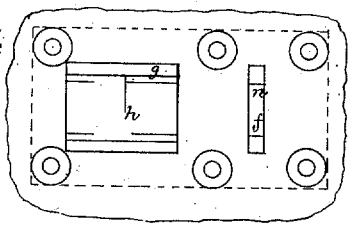
Fig. G.
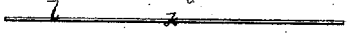
Fig. H.
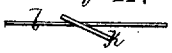
Fig. F.
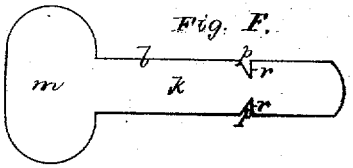
Fig. E.
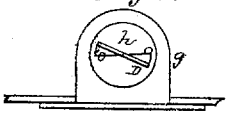
Witnesses.
Geo Gray
F. C. Hale.
E. A. Locke and W. B. Mason
by their attorney.
F. P. Hale
AM. PHOTO-LITHOGRAPHIC CO. N.Y. (OSBORNE'S PROCESS)

UNITED STATES PATENT OFFICE.

EDWARD A. LOCKE AND WILLIAM B. MASON, OF BOSTON, MASS.

IMPROVEMENT IN LOCKS FOR EXPRESS-BAGS, &c.

Specification forming part of Letters Patent No. 86,560, dated February 2, 1869; reissue No. 5,734, dated January 20, 1874; application filed November 15, 1873.

*To all whom it may concern:*

Be it known that we, EDWARD A. LOCKE and WILLIAM B. MASON, of Boston, in the county of Suffolk and State of Massachusetts, have invented a new and useful Improvement in Locking or Sealing Express-Bags, &c.; and we do hereby declare that the following, taken in connection with the drawings, which accompany and form part of this specification, is a description sufficient to enable those skilled in the art to practice it.

Our invention relates to a new method or principle of constructing seal-locks for express-bags and similar articles, the device being so made and applied that while the bolt or seal may be readily slipped into position to securely fasten the bag, it cannot be slipped from position, and can only be removed by destroying it—that is to say, by first cutting it asunder, and then removing the two parts in opposite directions; and our invention consists in making the bolt or seal of a thin elastic or yielding plate, (preferably of metal,) having its shank notched or shouldered, and providing the lock or socket piece (with which the bolt or seal operates) with means or devices so disposed within the socket-piece, as to cause the shank of the bolt or seal in passing through it to be so bent or twisted as to prevent the withdrawal of the bolt without rupture thereof.

In the drawing, Figure A shows a side view, and Fig. B a top view, of a bag fastened with a device constructed in accordance with our invention. Fig. C is a section on line *x x*. Fig. D is a section on the line *y y*. Fig. E is a section on the line *z z*. Fig. F is a plan of the bolt or seal. Fig. G is an edge view, and Fig. H an end view, thereof.

*a* denotes an ordinary express or mail bag, having a flap which turns over the mouth of the bag, and a strap, *b*, passing through staples *c*, which project through slits cut in the bag. At the movable end of the strap is a plate, *d*, in which is a slot, *e*, through which projects a button, *f*, said button being turned into line with the slot to slip the end of the strap over and from it, and at right angles to the slot, to secure the strap to the button. The shank of this button projects from a plate riveted to the bag, and from the same plate (or another riveted to the bag) projects a box, *g*, made of metal or other suitable material, which is bored or cut from end to end for the reception of a plug, *h*, which is brazed or otherwise permanently secured to the box *g*. Lengthwise through this plug extends a narrow slot, *i*, for reception of the shank *k* of a bolt or seal, *l*. This bolt is made of thin sheet metal or other suitable material, with a long strip, *k*, of even width, and a head, *m*. The width and thickness of this bolt or seal are or should be such as to exactly fill the slot *i*, so as to prevent the insertion of a wire or other device therein in order to bend or move the shoulders of the bolt. Through the button *f* is a slit, *n*, just long and wide enough to receive the bolt or seal shank *k*, this slit being in the same plane with the adjacent end of the slot *i*, which passes through the plug *h*. The slot *i* is in two parts, the part next to the button *f* being in the plane of the button-slit *n*, as just named, and extending in this plane to the center of the plug, or partially through the plug; but the opposite part of the slot being in a plane angular to the first part, as seen at E, two shoulders, *o o*, are formed in the plug at the junction of opposite parts of the slot, by this difference in the planes of the respective parts, or the angular position of one relatively to the other.

When the bag is closed and to be locked, the end of the strap is carried over the button; the button is turned; the small end of the seal or bolt is slipped through the button-slit, and then into and through the slot of the plug. Now, the bolt or seal shank is made with two notches, P, on it in its opposite edges, as seen at F, these notches being situated at a distance from the head *m* of the seal, corresponding to the distance from the button *f* to the shoulders *o*. These notches reduce the width of the bolt or seal shank, so that the end of the shank beyond the notches is readily twisted or bent, relatively to the rest of the shank, as seen at H, the pliability of the metal or material enabling the shank to be easily twisted. When the shank is pressed through the plug, its end readily slides from one part to the other, there being no obstruction in its passage; but as its end slides into the angular part of the slot it is bent thereby, and when the part beyond the notches P has passed the shoulders *o*, any attempt to draw back the bolt or seal brings the edges *r* against the shoulders, so that it is impossible to withdraw the bolt or seal.

From the foregoing it will be seen that the bag cannot be unlocked without first destroying the bolt or seal, the head *m* preventing farther forward movement of the bolt or seal, and the shoulder or shoulders of the plug or socket preventing its back movement To unlock the bag, the bolt or seal is severed between the button and the plug, the headed end being then drawn out of the button, and the notched end forward out of the plug.

The bag is thus fastened only to prevent robbery by persons intrusted with the care of the same in transmission, it being, in fact, an identifying or detective lock, which, being fastened up before delivery for transmission, cannot be unlocked and then relocked by the carrier; and the bolt or seals may not only be inaccessible to all, but the party for whom the bag is transmitted; but they may be consecutively numbered, or have other specific identifying characters marked or stamped thereon.

The plug is made in halves, each half being formed with two inclines, to produce upon the face of each the stop or shoulder *o*. I shows a side view of the two halves placed together.

Having described the nature, construction, and operation of our invention, what we claim is as follows:

1. In a safety sealing or locking device for express-bags, &c., a plug or socket-piece, provided with means or mechanism whereby the end of the bolt or seal, in passing through such socket-piece, is so bent or twisted that if drawn back it will be arrested by the stopping mechanism of the plug, substantially as set forth.

2. A plug or socket-piece made with the relatively-inclined slots, and the stops or shoulders to operate with a bolt or seal, in manner as set forth.

3. In a safety sealing or locking device for express-bags, &c., a bolt or seal made of a thin elastic or yielding plate, having its entering part notched or shouldered, and which, when slipped into its plug or socket-piece, becomes so twisted or bent thereby as to prevent it from being drawn out of the socket-piece without rupture, as set forth.

EDWARD A. LOCKE.
WILLIAM B. MASON.

Witnesses:
F. P. HALE,
F. C. HALE.